United States Patent
Birnbaum

(10) Patent No.: US 12,401,874 B2
(45) Date of Patent: Aug. 26, 2025

(54) ELECTROSTATIC BRAKES FOR CAMERA MODULES

(71) Applicant: Apple Inc., Cupertino, CA (US)

(72) Inventor: Zachary W. Birnbaum, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 155 days.

(21) Appl. No.: 18/373,824

(22) Filed: Sep. 27, 2023

(65) Prior Publication Data

US 2025/0106491 A1 Mar. 27, 2025

(51) Int. Cl.
*H04N 23/54* (2023.01)
*G03B 30/00* (2021.01)

(52) U.S. Cl.
CPC .............. *H04N 23/54* (2023.01); *G03B 30/00* (2021.01)

(58) Field of Classification Search
CPC ......... H04N 23/54; H04N 23/57; G03B 30/00
See application file for complete search history.

(56) References Cited

U.S. PATENT DOCUMENTS

| | | | |
|---|---|---|---|
| 5,241,340 A | 8/1993 | Fraser et al. | |
| 7,088,520 B2 | 8/2006 | Nishioka | |
| 10,136,040 B2 * | 11/2018 | Topliss | G02B 7/08 |
| 10,151,859 B2 | 12/2018 | Park | |
| 10,965,848 B1 * | 3/2021 | Ba-Tis | B81B 3/0062 |
| 11,019,266 B1 * | 5/2021 | Birnbaum | G03B 30/00 |
| 11,385,719 B2 | 7/2022 | Hinchet et al. | |
| 2008/0000304 A1 * | 1/2008 | Nagle | G01B 7/003 73/780 |
| 2014/0029120 A1 * | 1/2014 | Kim | G02B 7/09 359/823 |
| 2016/0173745 A1 * | 6/2016 | Kim | G02B 7/09 348/374 |
| 2021/0029275 A1 * | 1/2021 | Choi | H04N 23/51 |
| 2021/0096657 A1 | 4/2021 | D'Amone et al. | |
| 2022/0375910 A1 | 11/2022 | Liao et al. | |
| 2023/0148358 A1 * | 5/2023 | Sharma | H04N 23/55 348/345 |
| 2023/0273006 A1 * | 8/2023 | Sharma | H04N 23/55 348/345 |

* cited by examiner

*Primary Examiner* — Padma Haliyur
(74) *Attorney, Agent, or Firm* — Brownstein Hyatt Farber Schreck, LLP

(57) ABSTRACT

Embodiments disclosed herein relate to a camera module having a lens holder with a lens module, a sensor carrier with an image sensor positioned to receive light from the lens module, and an electrostatic brake assembly. The sensor carrier is moveable relative to the lens holder along a first direction. The electrostatic brake assembly is configured to lock a relative position between the sensor carrier and the lens holder in the first direction. The electrostatic brake assembly includes a first plate attached to the lens holder, a second plate attached to the sensor carrier, a first driver for charging the first plate to a first voltage, and a second driver for charging the second plate to a second voltage. A voltage differential between the first plate and the second plate locks the relative position between the sensor carrier and the lens holder.

20 Claims, 7 Drawing Sheets

400

```
┌─────────────────────────────────────────────────────────────┐
│  OPERATE AN ACTUATOR TO MOVE A SENSOR CARRIER TO A          │─ 410
│  PREDETERMINED POSITION RELATIVE TO A LENS HOLDER           │
└─────────────────────────────────────────────────────────────┘
                              │
                              ▼
┌─────────────────────────────────────────────────────────────┐
│  CHARGE A FIRST CONDUCTIVE PLATE AND/OR A SECOND            │
│  CONDUCTIVE PLATE TO GENERATE A VOLTAGE                     │─ 420
│  DIFFERENTIAL BETWEEN THE FIRST CONDUCTIVE PLATE            │
│  AND THE SECOND CONDUCTIVE PLATE                            │
└─────────────────────────────────────────────────────────────┘
```

*FIG. 3*

ELECTROSTATIC BRAKES FOR CAMERA MODULES

FIELD

The described embodiments relate generally to camera modules that may be used in electronic devices. More particularly, the present embodiments relate to a camera module that includes an electrostatic brake configured to lock a relative position between a lens module and an image sensor of the camera module.

BACKGROUND

Cameras continue to be an important feature of consumer electronics devices such as smartphones, tablets, and computers. When a camera is configured to move an image sensor and/or lens module within a camera (e.g., via an autofocus operation that adjusts the focus of the camera or via an optical image stabilization operation), external forces applied to the camera may cause unintended relative movement between these components. For example, the use of the camera in an environment where the camera is subjected to frequent or large vibrations may make it difficult to maintain the relative positioning between the image sensor and the lens module. This may result in degraded images captured by the camera, or may cause additional wear or damage as a result of the unintended component movement

SUMMARY

Described herein are camera modules having electrostatic brakes. Certain embodiments of this disclosure are directed to a camera module having a lens holder that carriers a lens module, a sensor carrier, and an electrostatic brake assembly. The sensor carrier carries an image sensor that is positioned to receive light from the lens module. The sensor carrier may be moveable with respect to the lens holder along a first direction. The electrostatic brake assembly is configured to lock a relative position between the sensor carrier and the lens holder in the first direction. The electrostatic brake assembly may include a first plate, a second plate, a first driver, and a second driver. The first plate may be attached to a bottom surface of the lens holder, and the second plate may be attached to a top surface of the sensor carrier. The first driver is configured to charge the first plate to a first voltage. The second driver is configured to charge the second plate to a second voltage, such that a voltage differential between the first voltage and the second voltage locks the relative position between the sensor carrier and the lens holder.

Other embodiments of this disclosure are directed to a camera module having a lens holder that carries a lens module, a sensor carrier, an actuator, an electrostatic brake assembly, and a controller. The sensor carrier carries an image sensor that is positioned to receive light from the lens module. The actuator is configured to generate relative movement between the sensor carrier and the lens holder in a vertical direction. The electrostatic brake assembly is configured to lock a relative position between the sensor carrier and the lens holder in the vertical direction. The electrostatic brake assembly includes a first plate, a second plate, a first driver, and a second driver. The first plate is attached to a bottom surface of the lens holder. The second plate is attached to a top surface of the sensor carrier. The first driver is operable to charge the first plate to a first voltage. The second driver is operable to charge the second plate to a second voltage. The controller is communicably coupled to the first driver and the second driver. The controller is configured to transmit a first signal to the first driver to charge the first plate, and a second signal to the second driver to charge the second plate.

Still other embodiments are directed to a camera module having a lens holder that carries a lens module, a sensor carrier, an actuator, an electrostatic brake assembly, and a controller. The sensor carrier carriers an image sensor. The sensor carrier is positioned below the lens holder and is moveable with respect to the lens holder in a vertical direction. The actuator is configured to generate relative movement between the sensor carrier and the lens holder. The electrostatic brake assembly is configured to lock a relative position between the sensor carrier and the lens holder. The electrostatic brake assembly includes a first plate, a second plate, and a set of drivers. The first plate is attached to a bottom surface of the lens holder. The second plate is attached to a top surface of the sensor carrier. The set of drivers is configured to apply a voltage differential between the first plate and the second plate. The controller is configured to lock the sensor carrier and the lens holder in the relative position by transmitting a first signal to the actuator to move the sensor carrier to a predetermined position relative to the lens holder, and by transmitting one or more signals to the set of drivers to apply a voltage differential between the first plate and the second plate, such that the sensor carrier and the lens holder are locked in the relative position when the sensor carrier is moved to the predetermined position.

In addition to the example aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which:

FIG. 3 shows a block diagram of a method of locking the relative position a sensor carrier and a lens holder in a camera module using an electrostatic brake, according to certain aspects of the present disclosure.

Figure 1A:
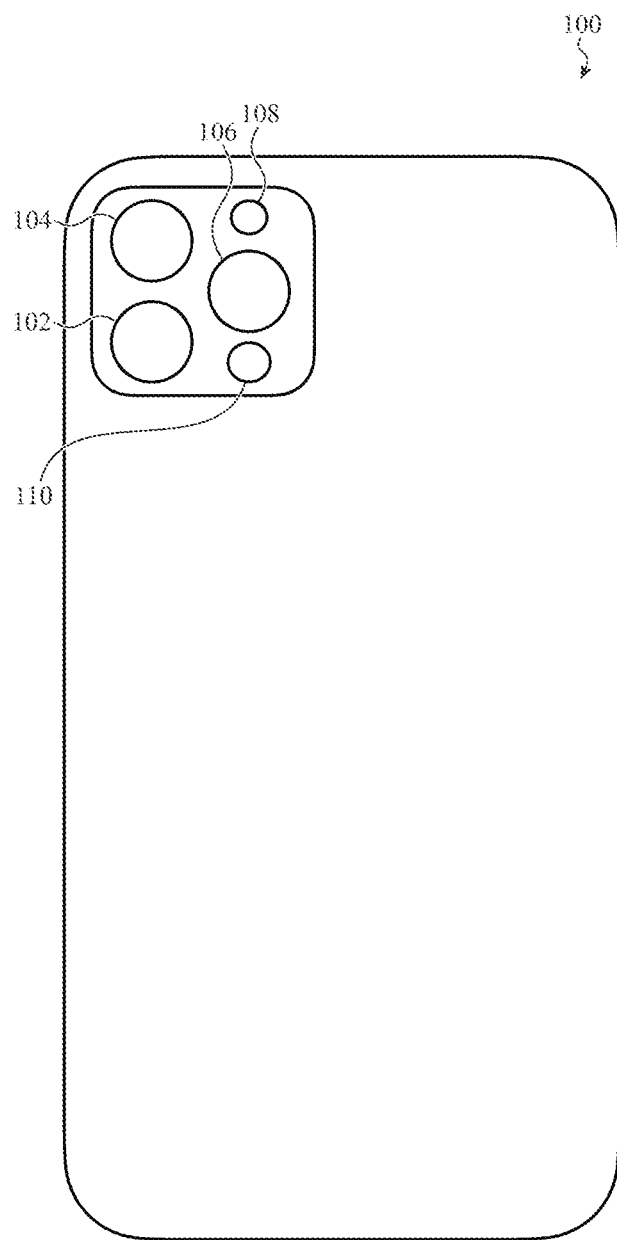
FIG. 1A illustrates a device as described herein having a camera module with an electrostatic brake, such as described herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Directional terminology, such as "top," "bottom," "upper." "lower," "front," "back," "over," "under." "above." "below." "left," "right," "vertical," "horizontal," etc. is used with reference to the orientation of some of the components in some of the figures described below, and is not intended to be limiting. Because components in various embodiments can be positioned in a number of different orientations, directional terminology is used for purposes of illustration to demonstrate the relative orientation between components of the systems and devices described herein. The directional terminology is intended to be construed broadly, and therefore should not be interpreted to preclude components being oriented in different ways.

Embodiments of the disclosure are directed to camera modules for use in electronic devices (e.g., smartphones, tablet computers, etc.) that include an electrostatic brake configured to lock a relative position between sensor carrier and a lens holder of the camera modules. The electrostatic brake is formed by one plate attached to a bottom surface of the lens holder and another plate attached to a top surface of the sensor carrier, each of which is formed from a corresponding electrically conductive material. A voltage differential may be applied between the two plates using a set of drivers (e.g., voltage drivers)—for example, a respective driver for each of the plates—in order to lock the lens holder and the sensor carrier together. When the two plates are positioned in sufficiently close proximity, the voltage differential results in an attractive electrostatic force between the two plates. This electrostatic force may be sufficiently large to hold the lens holder and the sensor carrier in a fixed relative position even as the camera module experiences significant accelerations or decelerations that would otherwise cause relative movement between the lens holder and the sensor carrier.

Accordingly, to lock the relative position between the lens holder and the sensor carrier, the camera module may be configured to generate (e.g., using an actuator) relative movement between the lens holder and the sensor carrier to achieve a predetermined relative position therebetween. This may act to position the two plates in sufficiently close proximity such that the electrostatic force between the plates (e.g., due to the voltage differential) becomes strong enough to effect the locking therebetween. The electrostatic brake does not require continuous input of power to operate, may stay charged for extended periods of time (subject to any incidental leakage that may gradually reduce the voltage differential over time). Accordingly, the electrostatic brake can be activated at any time the camera is not used, which may provide a lower-power mechanism to prevent against unwanted relative movement between the lens holder and the sensor carrier and thereby reduce wear on the camera module over time.

These and other structural and functional features are discussed below through embodiments in FIGS. 1A-3. However, those skilled in the art will readily appreciate that the detailed description given herein with respect to these Figures is for explanatory purposes only and should not be construed as limiting.

FIG. 1A depicts an example device 100 as described herein. As shown there, the device 100 includes a multi-camera system. For example, in the variation shown in FIG. 1A, the device 100 includes a first camera 102, a second camera 104, and a third camera 106. One or more of the first camera 102, the second camera 104, and the third camera 106 may include an electrostatic brake, as described herein. It should be appreciated that the device 100 may include a single camera, or a multi-camera system having any number of cameras (with any relative positioning) as may be desired. Additionally, while shown as placed on the rear of a device 100, it should be appreciated that a camera having an electrostatic brake, as described herein, may be additionally or alternatively placed on the front (e.g., a front side having a display) or any other side of the device as desired.

In some embodiments, the device 100 may include a flash module 108. The flash module 108 may provide illumination to some or all of the fields of view of the cameras of the device (e.g., the fields of view of the first camera 102, the second camera 104, and/or the third camera 106). This may assist with image capture operations in low light settings. Additionally, or alternatively, the device 100 may further include a depth sensor 110 that may calculate depth information for a portion of the environment around the device 100. Specifically, the depth sensor 110 may calculate depth information within a field of coverage (i.e., the widest lateral extent to which the depth sensor is capable of providing depth information). The field of coverage of the depth sensor 110 may at least partially overlap the field of view of one or more of the cameras (e.g., the fields of view of the first camera 102, second camera 104, and/or third camera 106). The depth sensor 110 may be any suitable system that is capable of calculating the distance between the depth sensor 110 and various points in the environment around the device 100.

The depth information may be calculated in any suitable manner. In one non-limiting example, a depth sensor may utilize stereo imaging, in which two images are taken from various positions, and the distance (disparity) between corresponding pixels in the two images may be used to calculate depth information. In another example, a depth sensor may utilize structured light imaging, whereby the depth sensor may image a scene while projecting a known pattern (typically using infrared illumination) toward the scene, and then may look at how the pattern is distorted by the scene to calculate depth information. In still another example, a depth sensor may utilize time of flight sensing, which calculates depth based on the amount of time it takes for light (typically infrared) emitted from the depth sensor to return from the scene. A time-of-flight depth sensor may utilize direct time of flight or indirect time of flight, and may illuminate an entire field of coverage at one time, or may only illuminate a subset of the field of coverage at a given time (e.g., via one or more spots, stripes, or other patterns that may either be fixed or may be scanned across the field of coverage). In embodiments where a depth sensor utilizes infrared illumination, this infrared illumination may be utilized in a range of ambient conditions without being perceived by a user.

In some embodiments, the device 100 is a portable multifunction electronic device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer, which may have a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content by transmitting, via a wired or wireless connection, data (e.g., image data or video data) to an integrated or external display generation component to visually produce the content.

Figure 1B:
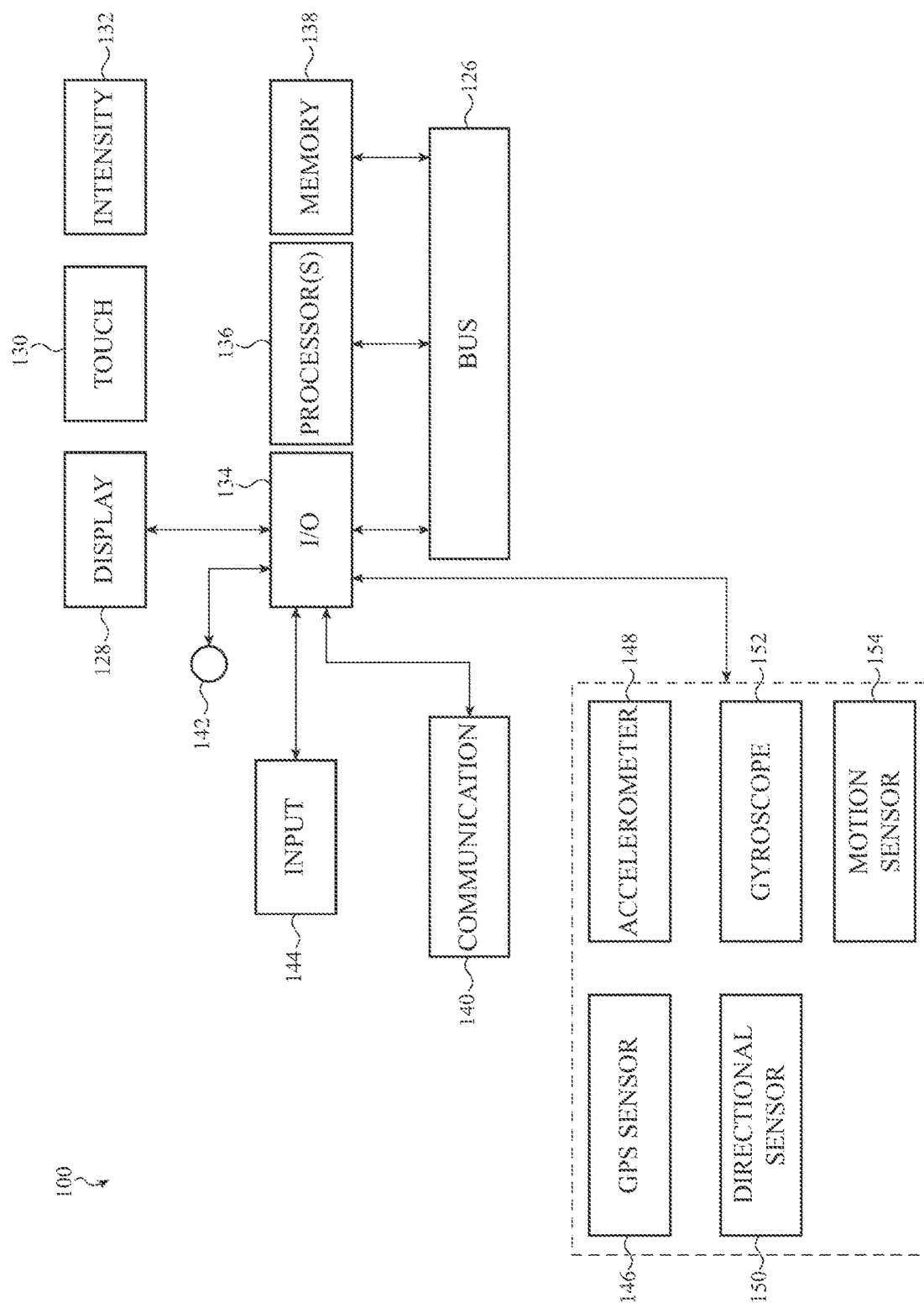
FIG. 1B depicts exemplary components of the device of FIG. 1A.

FIG. 1B depicts exemplary components of the device 100. In some embodiments, device 100 has a bus 126 that operatively couples an I/O section 134 with one or more computer processors 136 and memory 138. The I/O section 134 can be connected to display 128, which can have touch-sensitive component 130 and, optionally, intensity sensor 132 (e.g., contact intensity sensor). In addition, I/O section 134 can be connected with communication unit 140 for receiving application and operating system data, using Wi-Fi, Bluetooth®, near field communication (NFC), cellular, and/or other wireless communication techniques. The device 100 can include input mechanisms 142 and/or 144. Input mechanism 142 is, optionally, a rotatable input device or a depressible and rotatable input device, for example. Input mechanism 142 is, optionally, a button, in some examples. The device 100 optionally includes various sensors, such as GPS sensor 146, accelerometer 148, directional sensor 150 (e.g., compass), gyroscope 152, motion sensor 154, and/or a combination thereof, all of which can be operatively connected to I/O section 134. Some of these sensors, such as accelerometer 148 and gyroscope 152 may assist in determining an orientation of the device 100 or a portion thereof.

Memory 138 of the device 100 can include one or more non-transitory computer-readable storage mediums, for storing computer-executable instructions, which, when executed by one or more computer processors 136, for example, can cause the computer processors to perform the techniques that are described here (such as operating the electrostatic brakes as described herein). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray® technologies, as well as persistent solid-state memory such as flash, solid-state drives, and the like.

The computer processor 136 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of device 100, as well as to facilitate capturing of images as described herein. Device 100 is not limited to the components and configuration of FIG. 1B, but can include other or additional components in multiple configurations.

Figure 2A:
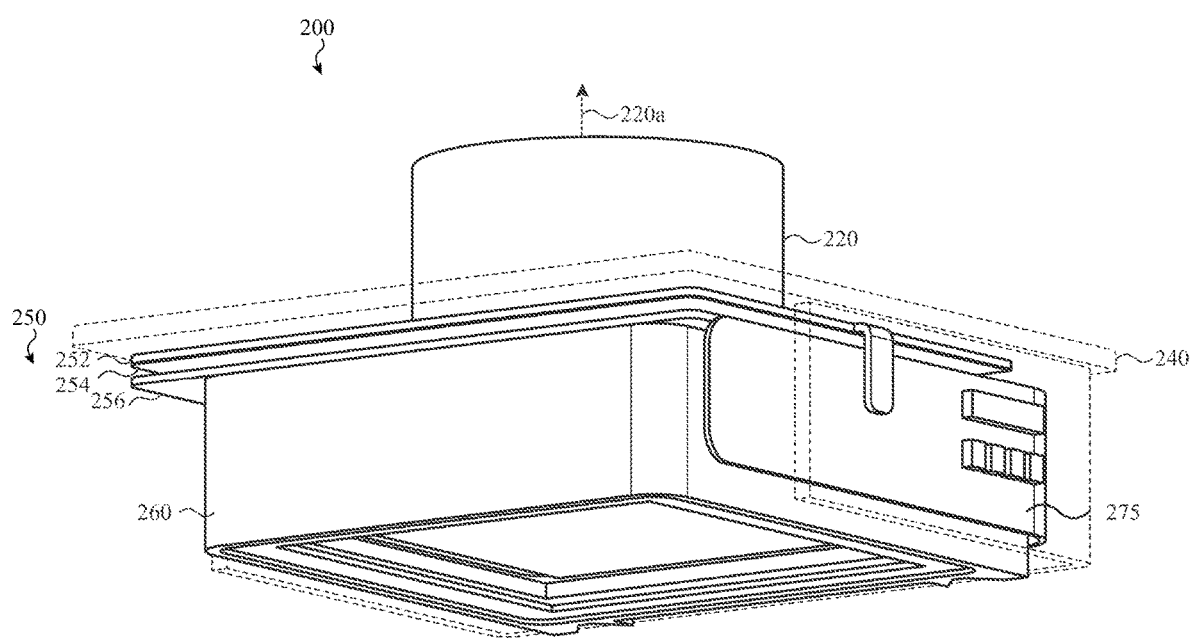
FIG. 2A shows a partial bottom perspective view of an example camera module having an electrostatic brake, such as described herein.
Figure 2B:
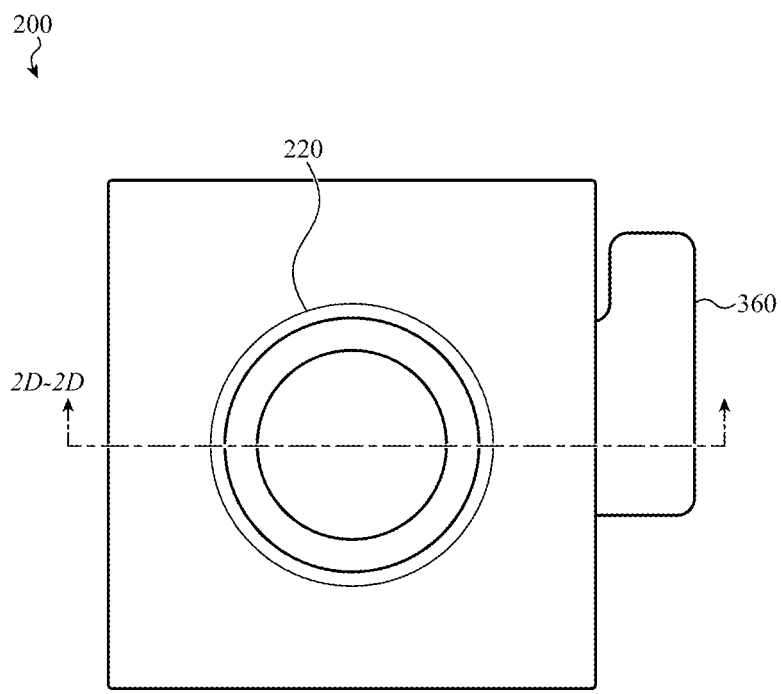
FIGS. 2B and 2C show top and exploded perspective views, respectively, of the example camera module of FIG. 2A.
Figure 2C:
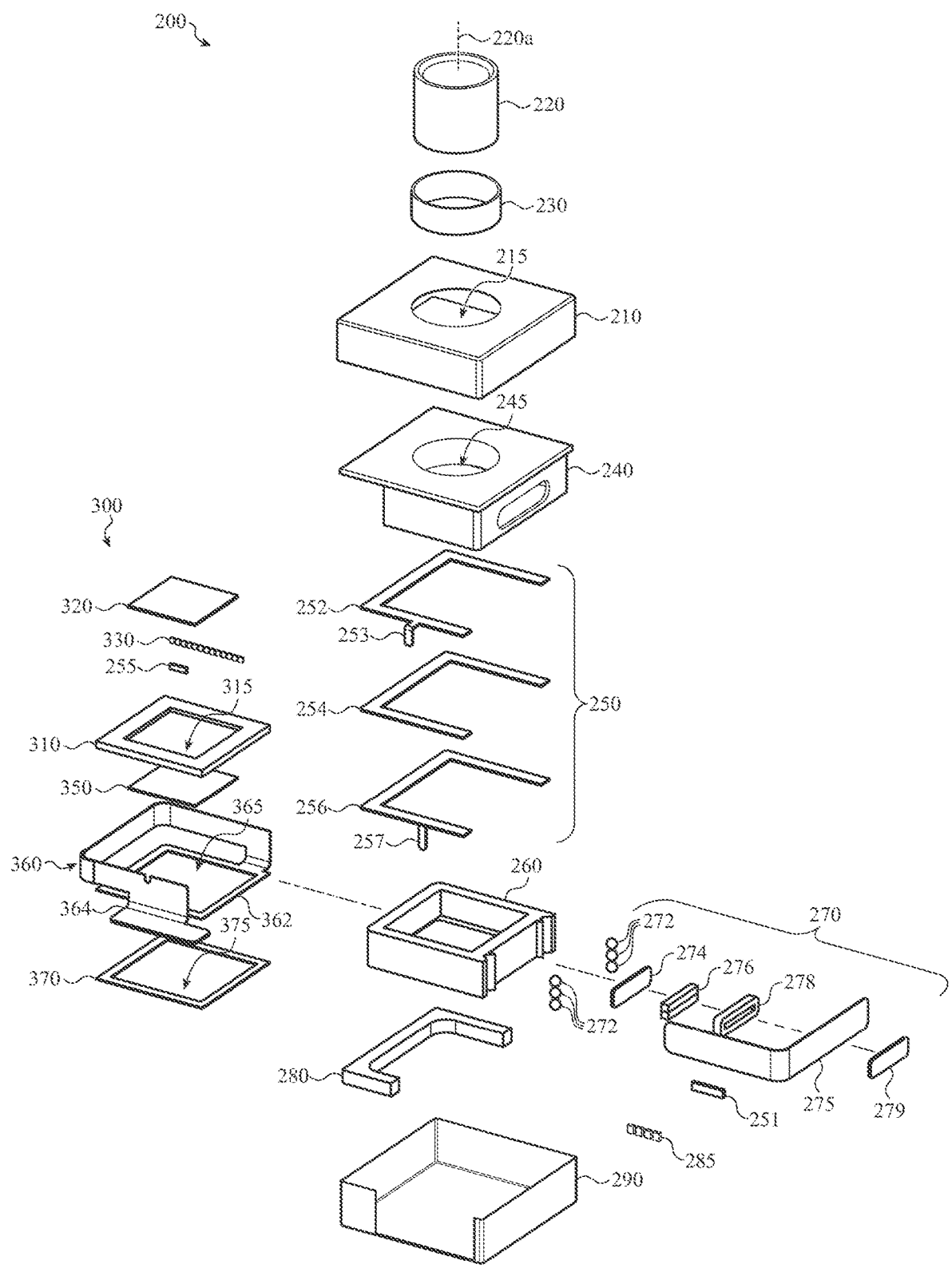
Figure 2D:
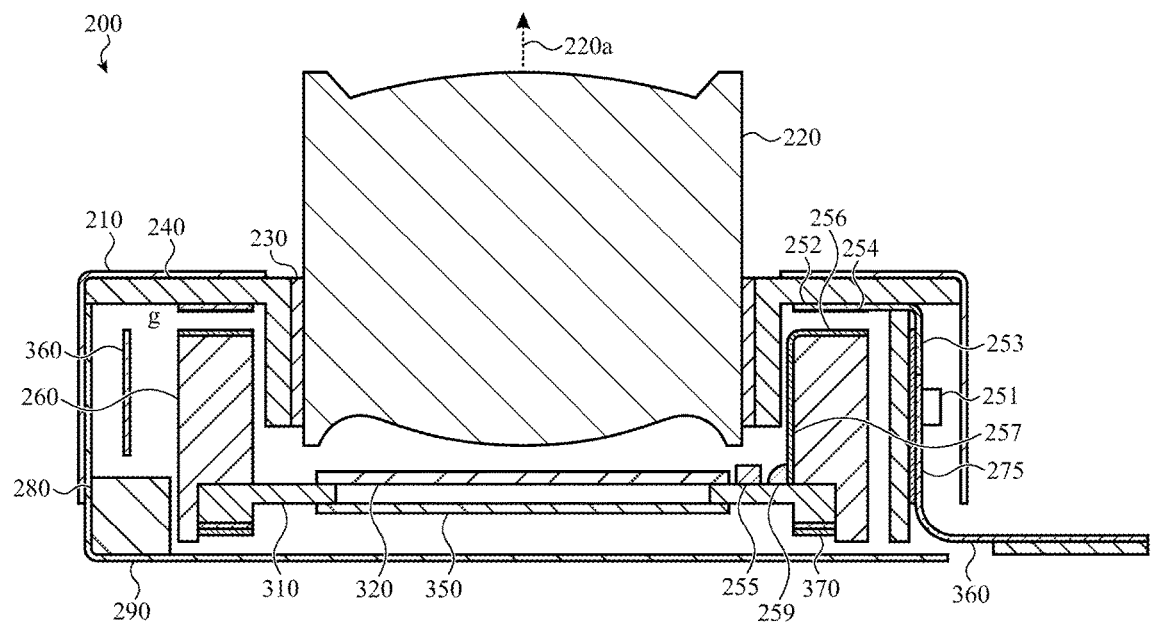
FIGS. 2D and 2E show cross-sectional views of the example camera module of FIG. 2B, taken along line 2D-2D of FIG. 2B.
Figure 2E:
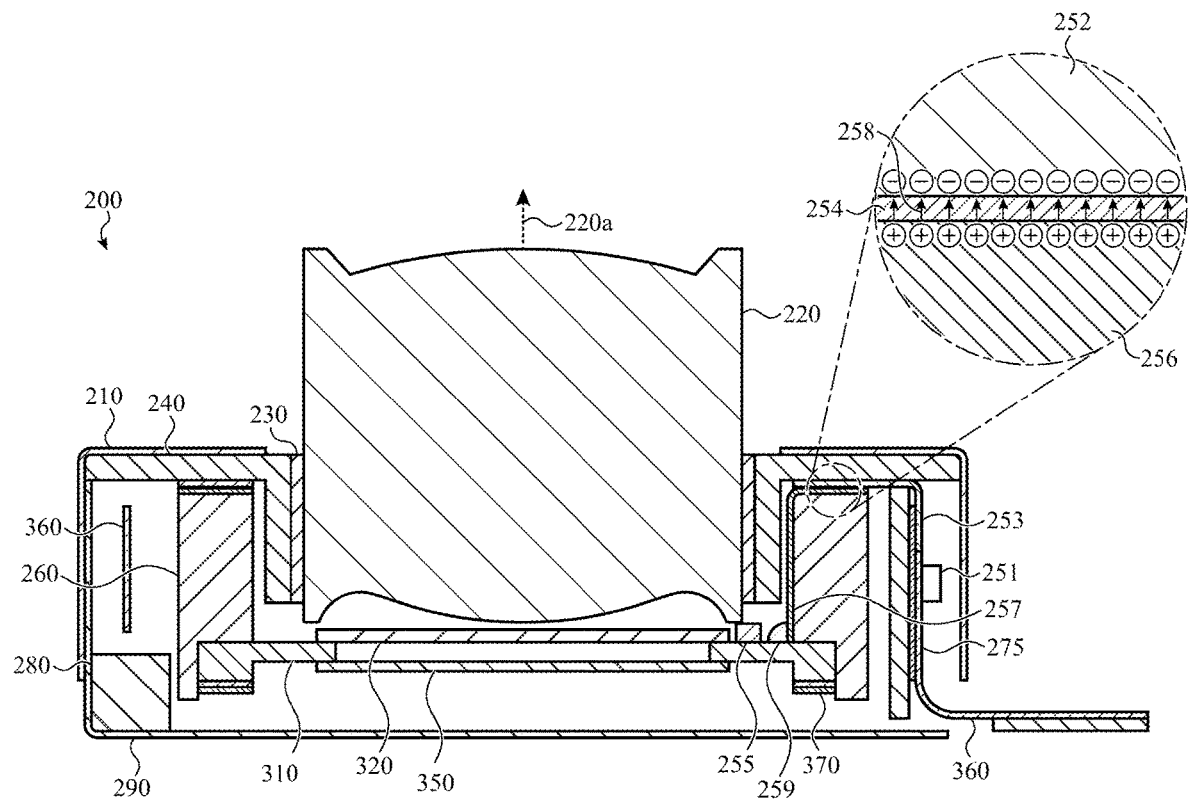

FIG. 2A shows a bottom perspective view of a portion of an example camera module 200 having an electrostatic brake 250 as described herein. FIGS. 2B and 2C show top and exploded perspective views, respectively, of the camera module 200. FIGS. 2D and 2E show cross-sectional views of the example camera module 200, taken along line 2D-2D of FIG. 2B. The camera module 200 includes a lens holder 240 that may carry a lens module 220, and a sensor carrier 260 that carries an image sensor assembly 300. During operation, an image sensor 350 of the image sensor assembly 300 may capture one or more images using light receive by the lens module 220. The components in camera module 200 may include an upper housing piece 210 and a lower housing piece 290 that together form an enclosure for housing various components of the camera module 200. The upper housing piece 210 and the lower housing piece 290 may be formed from a metal and act to shield components within the camera module 200 against electromagnetic interference.

The lens module 220 may be attached to the lens holder 240, and may hold the lens module 220 such that a portion of the lens module 220 protrudes outward through an opening 215 of an upper housing piece 210 of the camera module 200. The lens holder 240 may define a channel 245 that extends through the lens holder 240, and the lens module 220 may be attached to the lens holder 240 (e.g., using a bonding agent 230) such that the lens module 220 extends at least partially through the channel 245. In this way, light passing through the lens module 220 will also pass through the channel 245 before reaching the image sensor assembly 300. Overall, the positioning of the lens holder 240 within the camera module 200 may define a corresponding position of the lens module 220 within the camera module 200.

The lens module 220 includes one or more lens elements, and may include a lens barrel that houses and holds various optical elements (e.g., the lens elements, aperture layers, filters or the like). In some embodiments, the lens barrel of the lens module 220 may serve to hold some or all of the optical elements in a fixed relationship. The one or more lens elements (not shown) are configured to receive light from the external environment and direct light along an optical axis 220a of the lens module 220. The light is directed along the optical axis 220a to the image sensor 350.

The image sensor assembly 300 may be attached to sensor carrier 260, such that the positioning of the sensor carrier 260 within the camera module 200 may define a corresponding position of the image sensor assembly 300 within the camera module 200. The image sensor assembly 300 may include a substrate 310 and an image sensor 350. The image sensor 350 may be mounted to the substrate 310, which may route electrical signals to and/or provide mechanical support to the image sensor 350. For example, in some instances one or more additional electrical components 330 may be mounted to the substrate 310 (e.g., using surface-mount technology (SMT) techniques), some of which may be electrically connected to the image sensor 350 via the substrate. The substrate 310 may define an opening 315 that extends through the substrate 310, and the image sensor 350 may be positioned such that light received by the image sensor 350 first passes through the opening 315. The substrate 310 may be connected to the sensor carrier 260 (e.g. using adhesive bonding, welding, or the like) to attach the image sensor assembly 300 to the sensor carrier 260. In some variations, the image sensor assembly 300 may include a filter (such as infrared filter 320), such that light received by the image sensor 350 first passes through the filter.

The camera module 200 may be configured to controllably generate relative movement between the sensor carrier 260 and the lens holder 240, which thereby moves the lens module 220 relative to the image sensor 350. The direction (or directions) of relative movement may allow the camera module 200 to provide autofocus and/or optical image stabilization functionality. The relative movement between the sensor carrier 260 and the lens holder 240 may be generated in any suitable manner. In some instances, a position of the lens holder 240 (and thereby a corresponding position of the lens module 220) is fixed within the camera module 200, and the sensor carrier 260 (and thereby the image sensor 350) is moveably positioned within the camera module 200. In these instances, the sensor carrier 260 is moveable relative to lens holder 240 to change the relative position between the lens module 220 and the image sensor 350.

In other variations, a position of the sensor carrier 260 (and thereby a corresponding position of the image sensor 350) is fixed within the camera module 200, and the lens holder 240 (and thereby the lens module 220) is moveably positioned within the camera module 200. In these instances, the lens holder 240 is moveable relative to sensor carrier 260 to change the relative position between the lens module 220 and the image sensor 350. In still other variations, both the sensor carrier 260 and the lens holder 240 are moveably positioned within the camera module 200. In these instances, the sensor carrier 260 can be moved relative to the lens holder 240 or vice versa to change the relative position between the lens module 220 and the image sensor 350.

The camera module 200 may include one or more actuators configured to generate the relative movement between the sensor carrier 260 and the lens holder 240. For example, the variation of the camera module 200 shown in FIGS. 2A-2E is configured such the sensor carrier 260 is controllably movable along a vertical direction (e.g., along the optical axis 220a). In these instances, the camera module comprises an actuator 270 that is configured to move the sensor carrier 260 along the optical axis 220a, which may thereby move the image sensor 350 relative to the lens module 220.

The actuator 270 may be configured in any manner that may move the sensor carrier 260 relative to the lens holder 240, as will be readily understood by someone of ordinary skill in the art. For example, in some variations the actuator 270 may be configured as a voice coil motor actuator having a magnet 276 and a coil 278. The coil 278 may be positioned in a magnetic field of the magnet 276, such that when a current is driven through the coil 278, a Lorentz force is generated between the magnet 276 and the coil 278. For example, the magnet 276 may be connected to the sensor carrier 260 and the coil 278 may be connected to the lens holder 240 or another portion of the camera module, such that the Lorentz forces generated by the actuator 270 moves the sensor carrier 260 relative to the lens holder 240. Accordingly, the actuator 270 may move the sensor carrier 260 (and thereby the image sensor 350) through a range of positions during operation of the camera module 200 to adjust a focus of the camera module 200.

In some variations, the actuator 270 further includes a backing plate 274. The backing plate 274 may also be attached to the sensor carrier 260 such that the magnet 276 is positioned between the backing plate 274 and the coil 278. The backing plate 274 may be formed from iron or another ferromagnetic material that acts to redirect the magnetic flux for the magnet 276 in a direction toward the coil 278. This may improve the strength of the Lorentz force generated between the coil 278 and the magnet 276.

In some variations, the actuator 270 may further include a set of ball bearings 272 that are positioned to guide movement of the sensor carrier 260. For example, the sensor carrier defines a first set of raceways in which the ball bearings 272 may sit. Similarly, the lens holder 240 (or another portion of the camera module 200) may define a second set of raceways in which the ball bearings 272 may also sit. Collectively, the first and second sets of raceways, along with the ball bearings may facilitate movement of the sensor carrier 260 with respect to the lens holder 240 along a single direction (e.g., along the optical axis 220a) while restricting movement of the sensor carrier 260 with respect to the lens holder 240 in other directions.

In some variations, the actuator 270 may also include a preload plate 279. Magnetic preloading in the camera module 200 is intended to keep the sensor carrier 260 and the lens holder 240 in contact with the set of ball bearings 272 during operation of the camera module 200. In some embodiments, the preload plate 279 may be positioned within the magnetic field of the magnet 276 to form a preloading arrangement. The preload plate 279 may be formed from a ferritic material (e.g., steel), such that the preload plate 279 and the magnet 276 collectively provide a magnetic force that pulls the sensor carrier 260 and the lens holder 240 into contact with the ball bearings 272. While not depicted in FIGS. 2A-2E, the actuator 270 may include magnets that are used for magnetic preloading but not actuating movement, or vice versa. In some variations, the preload plate 279 may be coupled to the lens holder 240. For example, the coil 278 may be positioned between the preload plate 279 and the magnet 276.

The actuator 270 may further include a flexible printed circuit 275, which may be electrically coupled to the coil 278. The flexible printed circuit 275 may carry power and/or signals to and from the actuator 270. For example, the flexible printed circuit 275 may route current to the coil 278 to operate the actuator 270. The flexible printed circuit 275 may take any suitable shape or have any number of planar segments or any number of bends to conform to the shape of the camera module 200 and to conform to other constraints as may be needed. In some instances one or more additional electrical components 285 may be mounted to the flexible printed circuit 275 (e.g., using surface-mount technology (SMT) techniques).

In variations in which the sensor carrier 260 is moveably positioned in the camera module 200, it may be necessary to provide a pathway for power and/or data to be routed to and/or from the image sensor 350. For example, the image sensor assembly 300 may include a moveable flexible printed circuit 360 that is configured to route signals to the image sensor 350 while accommodating movement of the sensor carrier 260. Specifically, the flexible printed circuit 360 has a first end 362, a second end 364, and a plurality of planar segments connecting the first end 362 to the second end 364. The first end 362 may be fixed relative to the image sensor 350, and the second end 364 may be fixed relative to another component of the camera module 200. Accordingly the first end 362 may move with the sensor carrier 260, such that the first end 362 moves relative to the second end 364 of the flexible printed circuit 360 as the image sensor 350 is moved along a vertical direction. The planar segments may bend and/or twist to accommodate the movement of the sensor carrier 260 within the camera module 200.

In some variations, the flexible printed circuit 360 may be connected to the substrate 310. For example, the image sensor assembly 300 may comprise a stiffener 370, such that the first end 362 of the flexible printed circuit 360 is mounted between the stiffener 370 and the substrate 310. The flexible printed circuit 360 may include one or more electrical connection pads (not shown) at the first end 362, which may allow for the image sensor 350 to make electrical connections to the flexible printed circuit 360, either via direct connection with the image sensor or via direct connection to a component (such as the substrate 310) that is electrically connected to the image sensor 350. Accordingly, the flexible printed circuit 360 may route power, control, and/or other signals (e.g., image data) to and/or from the image sensor 350. The first end 362 of the flexible printed circuit 360 and the stiffener may define respective openings 365 and 375 extending through these components, which may facilitate the collection of light through these components. The flexible printed circuit 360 may further be configured in any manner such as described in disclosed in U.S. Patent Application Publication No. US2023/0069902, titled "Moveable flex circuit for cameras with moveable image sensors," the contents of which are incorporated herein by reference in their entirety.

In some variations, the flexible printed circuit 275 of the actuator 270 may be electrically connected to the moveable flexible printed circuit 360. For example, a portion of the flexible printed circuit 275 may be connected to the second end 364 of the moveable flexible printed circuit 360, such that the flexible printed circuit 275 is held in a fixed position in the camera module 200. In these instances, a portion of the second end 364 of the moveable flexible printed circuit 360 may extend outside of the enclosure (as shown in FIG. 2B) which allows one or more signals (e.g., power, control, and/or data signals) to be routed to and/or from the camera module 200 via the moveable flexible printed circuit 360. Additionally, signals may be routed to and/or from the flexible printed circuit 275 via the moveable flexible printed circuit 360.

In some variations, the camera module 200 may comprise one or more end stops configured to limit the range of motion of the sensor carrier 260. For example, in the variation shown in FIGS. 2A-2E, the camera module 200 may comprise an end stop 280. The end stop 280 may be positioned between a portion of the flexible printed circuit 360 and the lower housing piece 290, such as shown in FIGS. 2D and 2E. In these instances, the end stop 280 may limit how far the sensor carrier 260 may be moved away from the lens holder 240 along the optical axis 220a. Specifically, as the sensor carrier 260 is moved away from the lens holder 240 along the optical axis 220a, a portion of the flexible printed circuit 360 may contact the end stop 280 and limit further movement of the flexible printed circuit 360 (and thereby the sensor carrier 260) in that direction. Additionally or alternatively, the end stop 280 may be at least partially positioned between the sensor carrier 260 and the enclosure (e.g., the lower housing piece 290) along a direction perpendicular to the optical axis 220a. In these instances, the end stop 280 may limit unintentional lateral movement of the sensor carrier 260 relative to the optical axis 220a.

The electrostatic brake assembly 250 is configured to lock a relative position between the sensor carrier 260 and the lens holder 240, which may thereby lock a relative position between the image sensor 350 and the lens module 220. The electrostatic brake assembly 250 comprises a pair of conductive plates that may be charged to generate a voltage differential between the plates, which may thereby create an electrostatic force between the plates. Specifically, the electrostatic brake assembly 250 includes a first plate 252 connected to the lens holder 240 (e.g., to a lower surface of the lens holder 240 that faces the sensor carrier 260) and a second plate 256 connected to the sensor carrier 260 (e.g., to an upper surface of the sensor carrier 260 that faces the lens holder 240). Because the electrostatic brake assembly 250 relies on electrostatic forces to provide a locking force, the electrostatic brake assembly 250 may not generate any additional forces within the camera module when the first and second plate 252 are discharged. Accordingly, when the electrostatic brake assembly 250 is turned off, it may not interfere with operation of the actuator 270.

The electrostatic brake assembly 250 may include a dielectric layer 254 positioned between the first plate 252 and the second plate 256. The dielectric layer 254 may prevent the first plate 252 from contacting the second plate 256, and may thereby act to electrically isolate the first plate 252 from the second plate 256. In this way, the dielectric layer 254 may act to prevent current from flowing between the first plate 252 and the second plate 256, and thereby dissipating the voltage differential between the first plate 252 and the second plate 256. The dielectric layer 254 is shown in FIGS. 2D and 2E as formed on the first plate 252, though in other instances the dielectric layer 254 may be formed on the second plate 256. In other variations, a dielectric layer may be formed on each of the first and second plates (e.g., a first dielectric layer may be positioned on the first plate 252 and a second dielectric layer may be positioned on the second plate 256). The dielectric layer 254 may be configured with any thickness as may be desired to maintain the electrical isolation between the first and second plates 252, 256, while still allowing the first plate 252 and the second plate 256 to generate an electrostatic force sufficient to lock the sensor carrier 260 relative to the lens holder 240. Additionally, because the dielectric layer may be formed from a material having higher permittivity than air, the dielectric may increase the capacitance associated with the electrostatic brake assembly 250. This may thereby increase the strength of the electrostatic force between the first plate 252 and the second plate 256.

The electrostatic brake assembly 250 may include a set of voltage drivers configured to charge the first plate 252 and/or the second plates 256 to generate a voltage differential between the first and second plates 252, 256. In the variation shown in FIGS. 2A-2E, the set of voltage drivers includes a first voltage driver 251 that is configured to charge the first plate 252 to a first voltage, and a second voltage driver 255 that is configured to charge the second plate 256 to a second voltage.

The first voltage driver 251 may be electrically connected to the first plate 252 in any suitable manner. For example, the first voltage driver 251 may be mounted to the flexible printed circuit 275, such that the same flexible printed circuit 275 used to power the coil 278 of the actuator 270 is also used to power the first voltage driver 251. Similarly, the first plate 252 may comprise a first tab 253 that electrically connects the first plate 252 to the flexible printed circuit 275 (either via direct contact with the flexible printed circuit 275 or indirectly via the moveable flexible printed circuit 360). The first plate 252 and the first tab 253 may be formed as a monolithic piece, or may be formed as separate components that are electrically connected. The first voltage driver 251 may be electrically connected to the first plate 252 via the flexible printed circuit 275 and the first tab 253, such that the first voltage driver 251 may be controlled to charge the first plate 252 to a first voltage.

Similarly, the second voltage driver 255 may be electrically connected to the second plate 256 in any suitable manner. For example, in the variation shown in FIGS. 2A-2B, the second voltage driver 255 may be mounted to the substrate 310 of the image sensor assembly 300. The second plate 256 may comprise a second tab 257. The second tab 257 may extend along a side of the sensor carrier 260 and may connect to the substrate 310 (e.g., via a solder connection 259) to electrically connect the second plate 256 to the image substrate 310. The second voltage driver 255 may be electrically connected to the second plate 256 via the substrate 310, such that the second voltage driver 255 may be controlled to charge the second plate 256 to a second voltage.

The camera module 200 may include a controller that is configured to control the electrostatic brake assembly 250. The controller may be any combination of hardware, software, and firmware such as, but not limited to, the processor 136 described above, that is configured to control the set of voltage drivers (e.g., the first and second voltage drivers 251, 255) to generate a voltage differential between the first and second plates 252, 256. In some instances, the controller is positioned external to the enclosure of the camera module 200, such that the first voltage driver 251 and the second voltage driver 255 may be controlled and powered through the moveable flexible printed circuit 360.

Additionally, the controller may be configured to control the actuator 270. For example, to operate the electrostatic brake assembly 250 to lock the sensor carrier 260 relative to the lens holder 240, the controller may control the actuator 270 (e.g., through the flexible printed circuit 275) to move the sensor carrier 260 to a predetermined position relative to the lens holder 240. Specifically, the actuator 270 may move the sensor carrier 260 toward the lens holder 240 to reduce a gap g between the first plate 252 and the second plate 256, which may facilitate locking the sensor carrier 260 to the lens holder 240. It should be appreciated in instances where the lens holder 240 is moveable within the camera module 200 (e.g., in addition to or instead of a moveable sensor carrier 260), the actuator 270 may move the lens holder 240 to a predetermined position relative to the sensor carrier 260 as part of locking the electrostatic brake assembly 250.

As part of operating the electrostatic brake assembly 250, the controller be communicable coupled with and may control the set of voltage drivers to generate a voltage differential between the first plate 252 and the second plate 256. For example, the controller may control the first voltage driver 251 to charge the first plate 252 to a first voltage, and may control the second voltage driver 255 to charge the second plate 256 to a second voltage. It should be appreciated that the charging of the first and second plates 252, 256 and the movement of the sensor carrier 260 may be performed at least partially concurrently or sequentially as may be desired. Additionally, the first and second voltage drivers 251, 255 may be controllable (e.g., by the controller) to remove the voltage differential between the first and second plates 252, 256, which may act to unlock the electrostatic brake assembly 250.

FIGS. 2D and 2E illustrate the locking of the relative position between the sensor carrier 260 and the lens holder 240. When the electrostatic brake assembly 250 is disengaged, such as shown in FIG. 2D, the actuator 270 may be operated to move the sensor carrier 260 and the lens holder 240 (e.g., to perform an autofocus operation of the camera module 200). Accordingly, a gap g between the first plate 252 and the second plate 256 may vary with operation of the actuator 270. Even when the actuator 270 is not actively being operated (such as when the camera module 200 is not being used to capture images), external forces such as vibrations that are applied to the camera module 200 may cause unintended relative movement between the sensor carrier 260 and the lens holder 240.

When the first and second plates 252, 256 are charged to generate a voltage differential between the first and second plates 252, 256, an electrostatic force 258 may be generated between the first and second plates 252, 256. The magnitude of the electrostatic force may depend on the distance between the first and second plates 252, 256. Accordingly, when the sensor carrier 260 is moved upward to the predetermined position relative to the lens holder 240, the gap g may be sufficiently reduced such that electrostatic force is sufficient to hold the first plate 252 in place relative to the second plate 256. This may lock the sensor carrier 260 in place relative to the lens holder 240. In some variations, when the sensor carrier 260 is locked in place relative to the lens holder 240, the first plate 252 and the second plate 256 may be positioned in contact with the dielectric layer 254, such as shown in FIG. 2E.

Accordingly, the actuator 270 may be used to move the sensor carrier 260 to a predetermined position relative to the lens holder 240, and the electrostatic brake assembly 250 may lock the sensor carrier 260 in a locked position relative the lens holder 240. In some instances, the predetermined relative position is the same as the locked relative position (e.g., the electrostatic brake assembly 250 does not additionally move the sensor carrier 260 as part of the locking process). In other instances, the predetermined relative position may be different than the locked position (e.g., the electrostatic brake assembly 250 moves the sensor carrier 260 as part of the locking process).

In some embodiments, the electrostatic brake assembly 250 may be configured to lock the sensor carrier 260 relative to the lens holder 240 such that the lens module 220 and the image sensor 350 achieve a particular focus position. For example, in some variations the electrostatic brake assembly 250 may lock the image sensor 350 at a position that corresponds to an infinity focus of the lens module 220. Accordingly, the camera module 200 may be operated in a mode where the electrostatic brake assembly 250 has locked the sensor carrier 260 relative to the lens holder 240. During this mode, the camera module 200 may capture images (e.g., still images, videos, or the like) with the camera module 200 focused at infinity. This may be helpful in instances where the camera module 200 is being operated in a high-vibration environment (e.g., while a user is participating in sports such as mountain biking). Additionally or alternatively, the electrostatic brake assembly 250 may be activated (or left in a locked configuration) when the camera module 200 is not actively being operated, which may reduce the likelihood that external forces causes wear or otherwise damages components of the camera module 200. Because the electrostatic brake assembly 250 does not require ongoing power to keep the sensor carrier 260 locked relative to the lens holder 240, the sensor carrier 260 may remained locked relative to the lens holder 240 even when an electronic device incorporating the camera module 200 is turned off.

FIG. 3 shows a block diagram of a method 400, which may be executed by a controller, of locking the sensor carrier 260 and the lens holder 240 using the electrostatic brake assembly 250 of the camera module 200 of FIGS. 2A-2E. It should be appreciated that the steps of method 400 may be performed in any order. In block 410, an actuator may be operated to move the sensor carrier 260 to a predetermined position relative to a lens holder 240. In variations where the lens holder 240 is moveable relative to the sensor carrier 260, the actuator 270 may be operated to move the lens holder 240 to a predetermined position relative to the sensor carrier 260. To operate the actuator 270, the controller transmits a first signal to the actuator to move the sensor carrier (and/or the lens carrier).

In block 420, the first conductive plate 252 and/or the second conductive plate 256 may be charged to generate a voltage differential between the first conductive plate 252 and the second conductive plate 256. For example, the controller may transmit a second signal to the first voltage driver 251 to charge the first conductive plate 252 and may transmit a third signal to the second voltage driver 255 to charge the second conductive plate 256. When the lens holder and the sensor carrier are positioned at a predetermined relative position (e.g., as described with respect to block 420) and the voltage differential is generated between the first and second conductive plates 252, 256, the electrostatic brake assembly 250 may lock the sensor carrier 260 in a locked relative position relative to the lens holder 240.

In some embodiments, the locked relative position may be different from the predetermined position between the sensor carrier and the lens holder; while in other embodiments, the locked relative position and the predetermined position are the same. Further, in some embodiments, the locked relative position may correspond to an infinity focus of a lens element in the lens holder of the camera.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description, and not limitation. They are not targeted to be exhaustive or to limit the embodiments to the precise forms disclosed. It will be apparent to one of ordinary skill in the art, after reading this description, that many modifications and variations are possible in view of the above teachings or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A camera module comprising:
a lens holder having a lens module;
a sensor carrier having an image sensor positioned to receive light from the lens module, wherein the sensor carrier is moveable with respect to the lens holder along a first direction; and an electrostatic brake assembly configured to lock a relative position between the sensor carrier and the lens holder in the first direction, the electrostatic brake assembly comprising:
a first plate attached to a bottom surface of the lens holder;
a second plate attached to a top surface of the sensor carrier;
a first driver configured to charge the first plate to a first voltage; and
a second driver configured to charge the second plate to a second voltage, such that a voltage differential between the first voltage and the second voltage locks the relative position between the sensor carrier and the lens holder.

2. The camera module of claim 1, wherein the electrostatic brake assembly further includes a dielectric layer positioned between the first plate and the second plate along the first direction.

3. The camera module of claim 2, wherein the dielectric layer comprises a polyimide.

4. The camera module of claim 1, comprising:
an actuator configured to generate relative movement between the sensor carrier and the lens holder along the first direction, the actuator comprising a coil; and
a flexible printed circuit positioned and configured to route power to the coil.

5. The camera module of claim 4, wherein the first driver is positioned on the flexible printed circuit.

6. The camera module of claim 5, further comprising a first tab extending from the first plate to electrically connect the first plate to the first driver.

7. The camera module of claim 1, further comprising a second tab extending from the second plate to electrically connect the second plate to the second driver.

8. A camera module comprising:
a lens holder having a lens module;
a sensor carrier having an image sensor positioned to receive light from the lens module;
an actuator configured to generate relative movement between the sensor carrier and the lens holder in a vertical direction;
an electrostatic brake assembly configured to lock a relative position between the sensor carrier and the lens holder in the vertical direction, the electrostatic brake assembly comprising:
a first plate attached to a bottom surface of the lens holder; and
a second plate attached a top surface of the sensor carrier;
a first driver operable to charge the first plate to a first voltage;
a second driver operable to charge the second plate to a second voltage; and a controller communicably coupled to the first driver and the second driver, the controller configured to:
- transmit a first signal to the first driver to charge the first plate; and
- transmit a second signal to the second driver to charge the second plate.

9. The camera module of claim 8, wherein the electrostatic brake assembly further includes a flexible printed circuit fixed relative to the lens holder, the flexible printed circuit configured to power the actuator and the first driver.

10. The camera module of claim 9, wherein the first driver is coupled to the flexible printed circuit.

11. The camera module of claim 8, wherein the second driver is moveable with the sensor carrier in the vertical direction.

12. The camera module of claim 8, further comprising a moveable flexible printed circuit configured to power the second driver, the moveable flexible printed circuit having a first end that is fixed relative to the image sensor and moveable relative to a second end of the moveable flexible printed circuit when the image sensor moves along the vertical direction.

13. The camera module of claim 12, wherein the controller transmits the first signal and the second signal through the moveable flexible printed circuit.

14. The camera module of claim 8, wherein the controller is configured to apply, using the first signal and the second signal, a charge differential between the first plate and the second plate to provide an electrostatic locking force between the sensor carrier and the lens holder.

15. The camera module of claim 14, wherein the controller is configured to at least partially remove, using the first signal and the second signal, the charge differential to release the electrostatic locking force.

16. The camera module of claim 15, wherein the relative position corresponds to an infinity focus of the lens module in the lens holder.

17. A camera module comprising:
a lens holder having a lens module;
a sensor carrier having a substrate, the sensor carrier positioned below the lens holder and moveable with respect to the lens holder in a vertical direction;
an actuator configured to generate relative movement between the sensor carrier and the lens holder;
an electrostatic brake assembly configured to lock a relative position between the sensor carrier and the lens holder, the electrostatic brake assembly comprising:
- a first plate attached to a bottom surface of the lens holder;
- a second plate attached a top surface of the sensor carrier; and
- a set of drivers configured to apply a voltage differential between the first plate and the second plate; and a controller configured to lock the sensor carrier and lens holder in the relative position by:
- transmitting a first signal to the actuator to move the sensor carrier to a predetermined position relative to the lens holder; and
- transmitting one or more second signals to the set of drivers to apply a voltage differential between the first plate and the second plate, such that the sensor carrier and lens holder are locked in the relative position when the sensor carrier is moved to the predetermined position.

18. The camera module of claim 17, wherein the controller is further configured to control the set of drivers to remove the voltage differential and release the first plate and the second plate from the relative position.

19. The camera module of claim 17, wherein the relative position is different than the predetermined position of the sensor carrier relative to the lens holder.

20. The camera module of claim 17, wherein the first relative position corresponds to an infinity focus of the lens module in the lens holder.

* * * * *